United States Patent [19]
Sinclair

[11] Patent Number: 6,100,696
[45] Date of Patent: Aug. 8, 2000

[54] METHOD AND APPARATUS FOR DIRECTIONAL MEASUREMENT OF SUBSURFACE ELECTRICAL PROPERTIES

[76] Inventor: Paul L. Sinclair, 4708 Shoalwood, Austin, Tex. 78756

[21] Appl. No.: 09/005,068

[22] Filed: Jan. 9, 1998

[51] Int. Cl.[7] .................................................. G01V 3/10
[52] U.S. Cl. ........................... 324/339; 324/338; 324/369
[58] Field of Search ........................... 324/338, 339–341, 324/324, 343, 369, 347, 356

[56] References Cited

U.S. PATENT DOCUMENTS

| | | | |
|---|---|---|---|
| 3,496,455 | 2/1970 | Gouilloud | 324/339 |
| 3,808,520 | 4/1974 | Runge | 324/343 |
| 4,297,699 | 10/1981 | Fowler et al. . | |
| 4,302,723 | 11/1981 | Moran | 324/343 |
| 4,319,191 | 3/1982 | Meador et al. | 324/341 |
| 4,360,777 | 11/1982 | Segesman | 324/339 |
| 4,651,101 | 3/1987 | Barber et al. | 324/339 |
| 4,785,247 | 11/1988 | Meador et al. . | |
| 4,814,768 | 3/1989 | Chang . | |
| 4,857,852 | 8/1989 | Kleinberg et al. | 324/339 |
| 4,876,511 | 10/1989 | Clark . | |
| 4,940,943 | 7/1990 | Bartel et al. | 324/338 |
| 5,089,779 | 2/1992 | Rorden | 324/339 |
| 5,157,331 | 10/1992 | Smith | 324/338 |
| 5,212,495 | 5/1993 | Winkel et al. | 343/872 |
| 5,359,324 | 10/1994 | Clark et al. | 340/854.3 |
| 5,442,294 | 8/1995 | Rorden | 324/339 |
| 5,453,693 | 9/1995 | Sinclair et al. | 324/324 |
| 5,508,616 | 4/1996 | Sato et al. | 324/343 |
| 5,530,359 | 6/1996 | Habashy et al. | 324/338 |
| 5,563,512 | 10/1996 | Mumby | 324/339 |
| 5,644,231 | 7/1997 | Wignall | 324/303 |
| 5,661,402 | 8/1997 | Chesnutt et al. | 324/338 |
| 5,892,460 | 4/1999 | Jerabek et al. . | |

FOREIGN PATENT DOCUMENTS

| | | |
|---|---|---|
| 0 622 643 A1 | 4/1994 | European Pat. Off. . |
| 2 287 324 | 9/1995 | United Kingdom . |

OTHER PUBLICATIONS

Davies, D.H. et al., "*Azimuthal Resistivity Imaging: A New Generation Laterolog*," SPE 24676 pp. 143–153 (Oct. 4–7, 1992).

*Primary Examiner*—Jay Patidar
*Attorney, Agent, or Firm*—Fulbright & Jaworski, LLP

[57] ABSTRACT

A directional induction logging tool is provided for measurement while drilling. This tool is preferably placed in a side pocket of a drill collar, and it comprises transmitter and receiver coils and an electromagnetic reflector. The reflector, which may be a layer of highly conductive material placed between the coils and the body of the drill collar, serves to focus the electromagnetic fields generated and sensed by the tool in the direction away from the reflector, thus providing a directional response to formation conductivity with a relatively high depth of investigation. In preferred embodiments of the invention, magnetically permeable cores are placed within the coils to concentrate the magnetic fields that pass through them. Circuitry is described for balancing the mutual inductive coupling of the coils by injecting a direct current signal through one or more of the coils, which alters the magnetic permeability of the core material. The magnitude of the direct current required to achieve a balanced condition may be derived from the quadrature phase component of the return signal. Circuitry is also provided for generating a transmitted signal and for processing the return signals, including digital-to-analog conversion circuitry for providing digital data for transmission to the surface. This tool may be employed to provide real-time directional conductivity information that may be used to detect and follow bed boundaries in geosteering operations.

37 Claims, 7 Drawing Sheets

METHOD AND APPARATUS FOR DIRECTIONAL MEASUREMENT OF SUBSURFACE ELECTRICAL PROPERTIES

BACKGROUND OF TEE INVENTION

The present invention relates to a logging tool used to search for underground mineral or fossil fuel deposits and, more particularly, to a method and apparatus for determining the electrical conductivity of formations proximate to a borehole.

Electrical conductivity (or its inverse, resistivity) is an important property of a rock formation in geological surveys and prospecting for oil and gas because many minerals, and more particularly hydrocarbons, are less conductive than common sedimentary rocks. Thus a measure of the conductivity is often a guide to the presence and amount of oil or gas.

Induction methods using coils to generate and sense time-varying electromagnetic fields are widely used in borehole geophysical surveys, or "logs", to determine the local rock properties including conductivity, dielectric permittivity, and magnetic permeability. Typically, arrays of such coils mounted coaxially with the borehole axis, and operating in the frequency range from 5 KHz to 200 KHz (typically about 20 KHz) are used to sense the conductivity, while frequencies up to 200 MHz may be used to determine dielectric permittivity. The magnetic properties, while valuable, are not commonly measured by these methods due to the difficulty of separating their effects from those of conductivity.

Recent development of directional and horizontal drilling techniques allow the borehole to be "steered" while drilling in order to follow the boundaries of an oil-rich formation for a considerable distance instead of merely intercepting it, as was traditionally the case. This method is leading to revolutionary changes in recovery rates of oil and gas, combined with reduced drilling costs. Conductivity measuring tools and other gravity and magnetometer sensors are typically combined in a "measurement while drilling" (MWD) arrangement to provide a stream of data concerning the location and quality of hydrocarbon deposits while drilling. The data may also be used during completion of the well, when placement of casing perforations is being decided, by indicating regions where hydrocarbon saturation or producibility may be too low for completion. In addition, logs may be used to monitor a producing well that is not cased and to indicate the approach of water or gas boundaries (e.g. coning) during workover jobs. Generally, information about the location of the geological and fluid boundaries of a reservoir are very valuable in determining the total volume of hydrocarbon reserves.

For measurement-while-drilling applications, in particular, it is desirable to provide a logging tool that senses primarily to one side of the borehole and to a selected distance from the borehole, so that the proximity of an upper or lower boundary of a reservoir formation may be sensed before the drill-bit has penetrated through it, and in time for corrective action to be taken to modify the path of the bit through the formation. It follows that a method of sensing contrasting rock properties at the greatest distance in a selected direction would provide a distinct advantage. Of all the sensing means in common use, such as acoustic, nuclear and electrical, the wireline induction method has the greatest depth of investigation (up to five feet). However, the problem of adapting the induction technique to measurement-while-drilling has been found to be difficult, due to the influence of the mass of conductive metal in a drill-collar, and there are no known true MWD induction tools (directional or not) in commercial operation at this time. All existing MWD resistivity tools, other than those using electrodes, are based on a relatively high-frequency method commonly described as "wave propagation". These are induction tools that operate in a relatively high frequency range (typically 0.4 to 2 MHz) where the phenomenon of skin-effect dominates the propagation of the electromagnetic energy between coils, due to the conductivity and magnetic permeability of the nearby rock formations. Unfortunately, this limits the depth of investigation to significantly less than what a true induction tool can achieve and does not provide sufficient depth to modify the path of the drill bit before it has penetrated the formation.

While there is a continuing need for an induction tool for use in MWD, there are no commercially acceptable tools or services of this type available at this time. Various attempts have been made to place a standard wireline induction tool inside a non-conductive collar, usually made of a fiberglass-epoxy composite material. Such materials have successfully been used in drill-pipe and are commercially available from Brunswick Composites of Lincoln, Nebr. Unfortunately, the requirements for drill collars are much more severe than for drill pipe in terms of mechanical stresses (axial, torsional, and bending combined), and resistance to the abrasive effect of drill-cuttings and contact with the borehole wall. These environmental hazards lead to a short life for non-metal collars, particularly at junctions with metal collars that have higher rigidity.

U.S. Pat. No. 5,442,294 (Rorden) describes a method for placing coils in slots at various positions around the periphery of a drill collar at spaced-apart distances along the axis of the collar, to cancel the transmitter primary magnetic field, rather than the more usual induction tool arrangement of mutually-balanced coil arrays. Analysis shows that the Rorden method will suffer from the problem of significant errors due to a high sensitivity to conductive borehole fluids, and a shallow depth of investigation.

U.S. Pat. No. 5,508,616 (Sato, et al.) describes a directional induction tool for wireline logging with inclined coils rotated by a motor that can be used to map conductivity variations around the borehole. Many other earlier patents describe similar schemes using stationary orthogonal coil arrays to provide directional information about conductivity anisotropy (for example, see U.S. Pat. No. 3,808,520 (Runge), U.S. Pat. No. 4,302,723 (Moran), and U.S. Pat. No. 4,360,777 (Segesman). In general, these methods are not adaptable to MWD, because they do not solve the drill-collar conductivity problem.

A method of borehole logging at high frequencies for MWD or wireline employing reflectors with antenna elements to perform directional measurements is described in U.S. Pat. No. 5,530,359 (Habashy, et al.). This patent discloses a subsurface radar application, with a transmitter antenna at a spaced-apart distance along the tool axis and a set of receiver antennas placed around the periphery of the tool. A simultaneous sensing in all radial directions is thus achieved, and by a solution of a time-difference or a phase-difference equation the direction of a reflecting anomaly in the surrounding rock may be found. The method does not measure the conductivity of the anomaly or of the surrounding rock.

Various MWD antenna designs with antenna apertures that modify the reception pattern are described in U.S. Pat. No. 4,940,943 (Bartel, et al.) and U.S. Pat. No. 5,157,331

(Smith.). Means for encapsulating and protecting coil antennas for MWD are given in U.S. Pat. No. 5,661,402 (Chesnutt, et al.) and U.S. Pat. No. 5,212,495 (Winkel, et al.), but all these methods refer to tools of the "wave propagation" type operating at frequencies close to 2 MHz, and none are truly directional.

In U.S. Pat. No. 5,644,231, Wignall describes a method of using magnetic cores in a wireline tool and means to protect and enclose them to minimize the effects of high pressure and borehole fluid invasion. Finally, in U.S. Pat. No. 4,651, 101, Barber et al. describe methods for building a non-directional induction wireline tool with a metallic supporting structure that passes through the axis of the coils. (All of the patents discussed in this background section are hereby incorporated herein by reference.)

None of these prior logging tools provide, alone or in combination, an apparatus that is suitable for obtaining directional resistivity information near the bit while a well is being drilled, without being adversely effected by the mass of conductive metal in the drill collars. Such a tool would be desirable to provide real-time directionally focused information regarding nearby geological and fluid boundaries during directional drilling operations.

SUMMARY OF THE INVENTION

The present invention provides a novel logging apparatus by combining coil sensors with a reflector that can be installed in the side of a drill-collar, to make the spatial response of a MWD induction tool directional in an azimuthal sense relative to the borehole axis and to remove the influence of the drill collar material, thus providing real-time directional conductivity data for use during directional drilling operations.

More particularly, the present invention provides a method and apparatus for measuring currents induced in a rock medium by a time-varying magnetic field generated by transmitter coils positioned in front of a reflector disposed on a drill collar. This arrangement creates and senses a directionally oriented electromagnetic field that is not substantially affected by the body of the conductive drill collar located behind the reflector.

In one aspect, the invention provides a directional instrument for measuring electrical properties of rock formations near a borehole, comprising a transmitter coil coupled to a signal generator; at least one receiver coil disposed coaxially to the transmitter coil, the axis of the coils defining the axis of the instrument, the at least one receiver coil being coupled to a signal processing circuit; and a conductive reflector spaced from the transmitter coil and the receiver coils, the reflector being generally parallel to the axis of the instrument. The reflector may be generally "V" shaped in cross-section, with the transmitter coil and the receiver coils arranged within the space defined by the reflector and generally parallel to the reflector. In preferred embodiments, this apparatus is positioned in a side pocket formed in a drill collar, so that it can be used near the bit in a drill string. Any number or arrangement of transmitter and receiver coils may be employed using the principles of this invention, as will be apparent to one skilled in the art.

In preferred embodiments, the invention includes a balancing circuit for detecting any imbalance in mutual inductance coupling between the transmitter and receiver coils and for adjusting the magnetic permeability of the core material in at least one of the coils to correct the imbalance. This function may be implemented with a direct current generating circuit that is connected to said at least one of the coils so as to pass a selected current therethrough, and wherein the direct current generating circuit is connected to receive a quadrature phase signal from the signal processing circuit.

In another aspect, the present invention provides a directional resistivity tool for measurement while drilling that is adapted to provide a measurement of formation resistivity on a selected side of a borehole, comprising a drill collar having a side pocket and a flow channel formed therein; an electromagnetic reflector formed in the side pocket; a transmitter coil disposed within the side pocket and operably coupled to a signal generator; and a receiver coil disposed in the side pocket, the receiver coil being coupled to a signal processing circuit.

In another aspect, the invention provides a method of measuring the apparent conductivity of subsurface formations proximate a borehole in a selected azimuthal direction from the borehole while the borehole is being drilled, comprising providing a directional resistivity measuring tool disposed in a drill collar near the bit, the directional resistivity measuring tool including transmitter and receiver coils and a conductive reflector. The method includes energizing the transmitter coil with a selected periodic signal, detecting return signals using the receiver coil, and processing the return signals to obtain the apparent conductivity. The directional resistivity measuring tool may comprise in-phase and quadrature phase detectors coupled to the receiver coil, and the processing step may include obtaining an in-phase component of the return signal and a quadrature phase component of the return signal.

BRIEF DESCRIPTION OF THE DRAWINGS

So that the manner in which the herein described advantages and features of the present invention, as well as others which will become apparent, are attained and can be understood in detail, more particular description of the invention summarized above may be had by reference to the embodiments of the invention which are illustrated in the appended drawings, which drawings form a part of this specification.

It is noted, however, that the appended drawings illustrate only exemplary embodiments of the invention and are, therefore, not to be considered limiting of its scope, for the invention mayadmit to other equally effective embodiments.

DESCRIPTION OF PREFERRED EMBODIMENT

Figure 1:
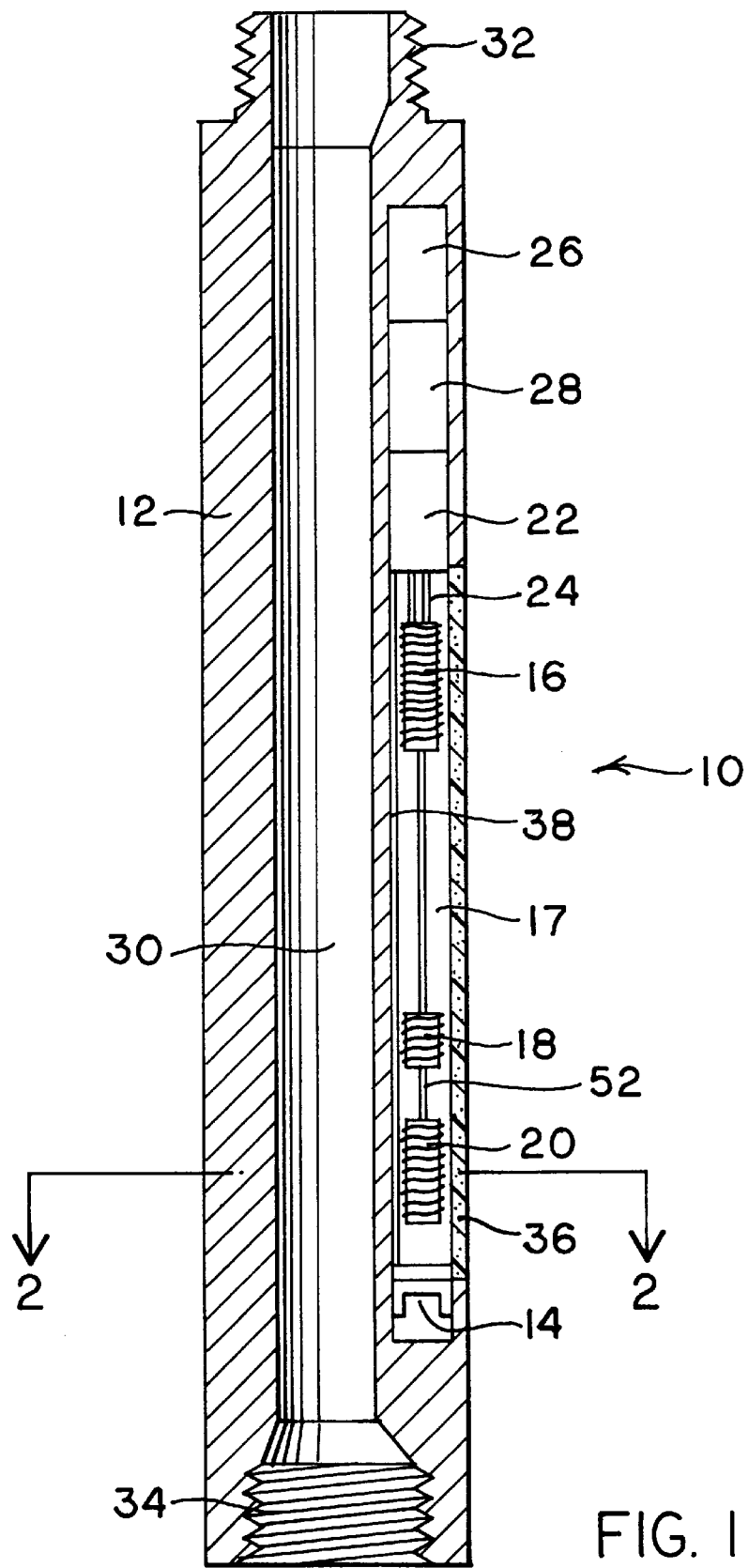
FIG. 1 is a sectional elevation view taken on a plane passing through the long axis of the tool and indicated by the line 1—1 in FIG. 2.

The basic physical theory underlying this invention is well-known in the study of electromagnetic fields. A solenoidal transmitter coil of wire that is energized with a timevarying (in preferred embodiments, sinusoidal) electric current will generate a proportionate time-varying magnetic field extending in all directions from the axis of the coil, such that in a proximate conductive medium circulating currents will be induced to flow. These are commonly known as Foucault or "eddy" currents, and their magnitude is proportional to the conductivity of the medium at distances from the coil much less than the skin-depth in the medium (defined as inversely proportional to the square-root of the product of frequency and conductivity). The Foucault currents in turn induce a proportionate voltage in other receiver coils placed in the vicinity, usually coaxially with the transmitter coil. In a true induction tool, the frequency is made low enough to substantially remove skin-effect, so that the maximum depth of investigation may be achieved and the induced voltage may be substantially proportionate to the conductivity of the rock formation at the depth of investigation. If the coils are located in a borehole and the magnetic fields extend equally in all directions, then there is no directional information available in the induced voltage to indicate the presence of a conductivity anomaly on one side of the borehole, and a large mass of conductive metal (such as a steel drill-collar) will introduce a large, uncontrolled receiver voltage that may mask the desired voltage information based on properties of the rock formation.

Now consider the ideal case where a perfectly conducting plane surface is placed parallel to but at a small distance from the axis of the transmitter and receiver coils. A time-varying magnetic field can not penetrate a perfect conductor, because in doing so it generates Foucault currents that in turn generate a magnetic field that (by Lenz's Law) oppose and exactly cancel the incident field within the perfect conductor. As a result, the incident field is distorted and appears to be "pushed away" from the conducting plane. It is as if there were an image coil associated with each actual coil positioned at a distance behind the plane equal to the distance each coil is spaced in front of the plane, similar in principle to the optical "virtual image" that appears to be behind a mirror. The image coil has an associated magnetic field of equal strength and a polarity so as to cancel the field trying to penetrate the conducting plane.

More importantly, this field cancellation extends through the space in front of the plane and focuses the resulting magnetic field in a direction normal to the surface of the plane. Thus the reflecting conductive plane simultaneously achieves the objectives of (a) focusing the magnetic fields associated with coils in a preferred azimuthal direction relative to the coil axis, and (b) preventing any interaction of the field with material, such as a drill-collar, placed behind the plane. The Law of Reciprocity known to those familiar with this art teaches that the same analysis applies to receiver coils that are sensing magnetic fields as it does to transmitting coils that are generating magnetic fields. A conductive medium (such as a rock formation) placed before an assembly of coils and a reflector will induce a voltage proportionate to the conductivity of the medium in the receiver coils, as with any induction tool. More particularly, a conductivity anomaly, such as a boundary of a rock bed of contrasting conductivity, placed in front of the assembly will be sensed when the instrument is pointed toward the boundary, and a voltage proportionate to the integrated conductivity within the sensitive region may be recorded.

If the coil/reflector assembly is rotated, for example, by turning the drill string, while the receiver coil voltage and data from mechanically associated gravity and magnetometer sensors (in an orientation tool) are monitored, then the precise direction of a bed boundary can be determined by observing "peaks" and "nulls" in the recorded voltage, depending on whether the rock bed being sensed is more or less conductive than the rock immediately surrounding the borehole. This method of rotation is quite practical in a normal drilling environment, where the drill-string is continuously turned to drive the drill-bit. More conveniently, when the drill-bit is driven by a down-hole mud motor, the drill-string may be slowly rotated to effect a steering mechanism with a bent-sub, or simply to prevent sticking of the drill-string in the borehole. In any event, the rotation can be precisely controlled by the rotary table and kelly on the drilling rig, while data from induction and orientation tools near the drill bit may be conveyed to the surface via a mud-pulse telemetry system or other means known in the art.

Figure 2:
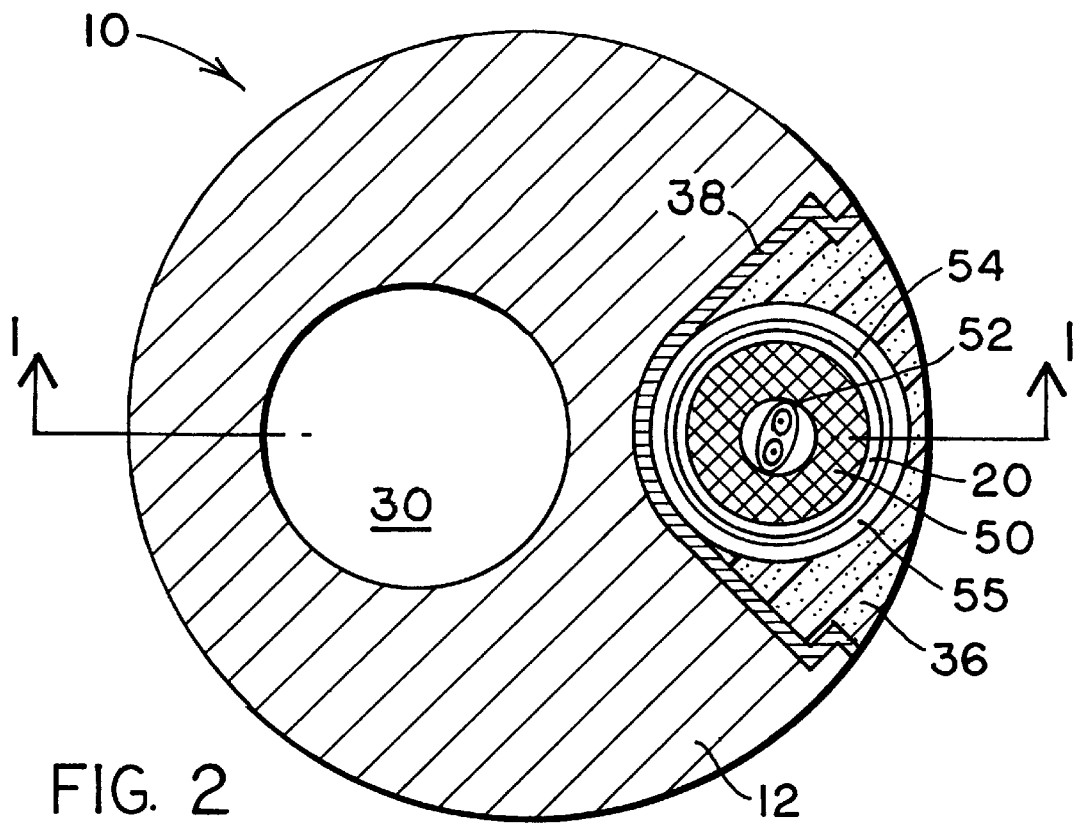
FIG. 2 is a cross-sectional view through the collar and coils on a plane indicated by the line 2—2 in FIG. 1.

FIGS. 1 and 2 depict two orthogonal sectional views of a preferred embodiment of the instant invention and should be used together to gain a better understanding of the invention. Referring to FIG. 1, there is shown an induction tool 10 placed in a side channel of a drill collar 12. The tool 10 contains an array of coils, magnetic cores, and a reflector embedded in an insulating material. In the preferred embodiment, these elements are constructed with a particular shape, using specially chosen materials (to be described) to implement an operative sensor package. The tool also contains a pressure compensator 14 of conventional design to allow spaces within the sensor package to be filled with insulating oil 17 maintained at a hydrostatic pressure slightly higher than the borehole fluids, thus removing high pressure differentials from the sensor package and preventing ingress of borehole fluids.

Referring to the preferred embodiment illustrated in FIGS. 1 and 2, transmitter coil 16 and receiver coils 18, 20 are coaxially positioned within the side channel of drill collar 12. The coils are connected to induction tool data acquisition circuits 22 (described below in connection with FIG. 6) by conductive cables 24. The apparatus may also include battery and power supply circuitry 26 and memory or telemetry apparatus 28, as are well known in the art and outside of the scope of the present invention.

Drill collar 12 includes mud channel 30 and threaded couplings 32, 34 for connection of drill collar 12 to adjacent collars or other components of the drill string.

Magnetic cores 50 are positioned within each coil 16, 18, 20 to allow use of much smaller diameter coils than usual by concentrating the magnetic flux inside the coils. Since induction tools rely on the use of mutual-inductance balance (described in more detail later), it is important to use a low-loss ferromagnetic material for the cores with a permeability that is stable with changes in temperature and pressure. Examples of suitable cores are type MPP powderpermalloy cores manufactured by Arnold Engineering, Marengo, Ill., type TH powdered carbonyl iron from TSC Arnold Technologies of Wadsworth, Ill., and Type 64 Nickel-Zinc Ferrite from Amidon Associates of N. Hollywood, Calif. A plurality of toroid cores may be stacked axially to provide a core length to match the length of the associated coil.

In the design of the magnetic cores, the length/diameter ratio (l/d) and permeability ($\mu$) are of prime importance in determining the gain associated with magnetic flux coupled to the coil and also in reducing the influence of variations of permeability. The effective gain, G, of a coil including a core may be calculated as follows:

$$G = \mu \bigg/ \left[1 + \frac{\mu - 1}{1.6 + 2.2(l/d)^{1.5}}\right]$$

Stable values of gain are found with high values of $\mu$ (consistent with acceptable stability) and high values of l/d. The transmitter and receiver coils 16, 18, 20 in preferred embodiments of the invention may be wound on a temperature-stable fiberglass/epoxy composite forms using copper Litz wire and connected to electronic circuits by shielded twisted-pair cables 52, 54. Suitable Litz wire used in the preferred embodiments is type NELB41/36 for transmitter coils and type NELB16/36 for receiver coils, available from New England Electric Wire Corp., of Lisbon, New Hampshire.

In preferred embodiments of this invention, the coils, cores, and associated cables are installed in a fiberglass/epoxy tube 55 with cylindrical spacers of the same material. The magnetic cores 50 may be made by stacking readily available toroid components, leaving a central hole in the cores to pass the cables 52 through in order to make connections to the coils 16, 18, 20. Since nearly all the magnetic flux passes through the cores, very little is intercepted by the cables, which would otherwise be susceptible to induced cross-talk signals. The coils may be equipped with electrostatic shields 54, which are well-known in the art, to prevent unwanted capacitive coupling between transmitter coil 16 and receiver coils 18, 20.

The tool also comprises reflector 38, which may consist of a thick sheet of soft-annealed copper or preferably a stacked and laminated assembly of thin soft-copper sheets. In preferred embodiments, the total thickness of the reflector is equivalent to at least about six times the skin-depth at the frequency of operation of the tool. At a frequency of 20 KHz, this corresponds to a total copper thickness of approximately 0.125 inches. The preferred embodiment employs a generally V-shaped reflector 38 as shown in FIG. 2, enclosing the coils 16, 18, 20 on the side nearest the drill-collar axis and opening toward the borehole with an included angle that may be in the range of 60 to 90 degrees in preferred embodiments. In an alternative embodiment, the drill collar in which the coils are mounted may be made of a conductive material, such as beryllium-copper. In that case, the drill collar itself serves as the reflector, and no additional reflector is required.

While the present description describes a three-coil array, the invention is not limited to such a configuration, but may also incorporate other coil array designs such as the well-known six-coil array, or multiple coil arrays to provide multiple spatial responses. Also, the roles of the transmitter and receiver coils can be reversed in any tool design, as is well known in the art. These alternative embodiments would be obvious extensions of the present invention.

Insulating material 36 is employed to encase the coils and other components and to fill the side pocket formed in the drill collar, as shown in FIGS. 1 and 2. This material is a structural element that retains the tool components in the collar, as well as a shock-isolation medium protecting the sensor components from stresses caused by impact between the collar 12 and the borehole wall. The material preferably has a mechanical modulus of elasticity close to that of the collar material, while being a low-loss electrical insulator to allow magnetic flux to pass freely therethrough. An example of a suitable material for use in preferred embodiments of the invention is a composite of a high-temperature rated epoxy such as Duralco 4460 manufactured by Cotronics Corp. of Brooklyn, N.Y., mixed with at least 50% Aluminum Oxide powder manufactured by Norton Industries (a division of Saint-Gobain), in Worcester, Mass. This powder is normally used as an abrasive, but it is also an excellent dielectric insulator that bonds well to epoxy. The insulator assembly may be made in layers with glass fiber reinforcement and cast in a mold to final dimensions, using well-known techniques. The portion of the insulator in contact with the borehole may be further strengthened and made more abrasion-resistant by the incorporation of up to, for example, 20% Silicon Carbide powder, also made by Norton Industries, in a layer having a depth of, for example, at least 0.25 inches. Silicon Carbide is a semiconducting material, so will introduce error signals if its concentration is too high.

Figure 3:
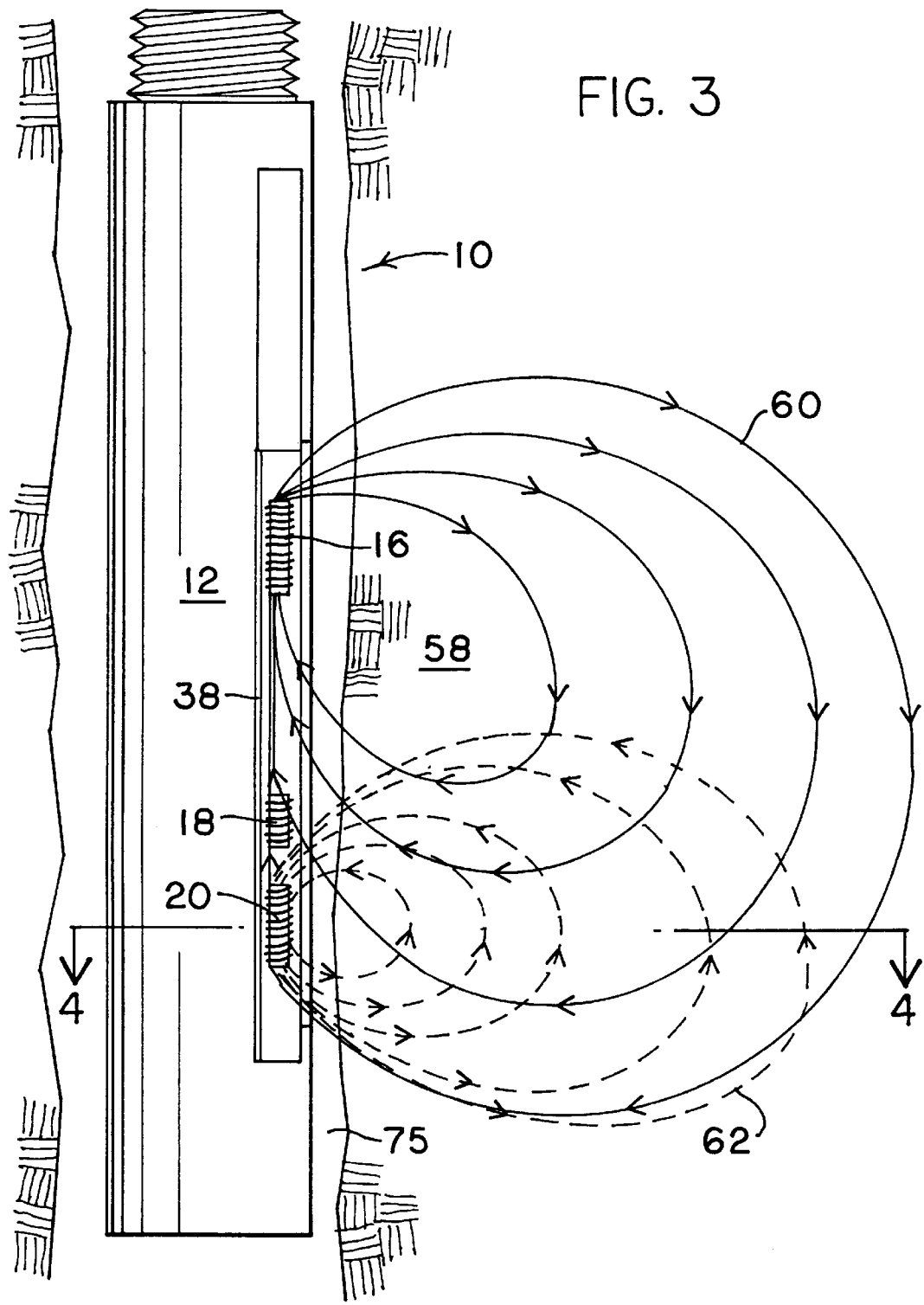
FIG. 3 is a partial vertical sectional view indicating lines of magnetic field flux.

FIG. 3 illustrates how, in a preferred embodiment, the upper transmitter coil 16 will generate a time-harmonic primary magnetic field extending out into adjoining rock formations 58. Imaginary solid lines of magnetic flux 60 are intended to convey qualitatively the intensity and direction of the flux. This primary flux will generate Foucault currents in any proximate conductive rock medium 58 which, in turn, generate a secondary flux 62 (shown by dashed lines) that couples to and induces a voltage in the receiver coils 18, 20. By Lenz's Law, the secondary flux 62 opposes the primary flux 60 as indicated by noting the direction of the arrow heads on the flux lines. This diagram also shows how reflector 38, even though it is not a perfect conductor, will direct and focus the magnetic flux in the desired direction of investigation. The distance between transmitter coil 16 and the main receiver coil 20 may be, for example, about 40 inches, with the bucking receiver coil 18 placed, for example, about 34 inches from the transmitter. The number of turns of wire on each coil may be chosen to achieve zero mutual coupling between transmitter coil 16 and the series-opposition connected receiver coils 18, 20.

Figure 4:
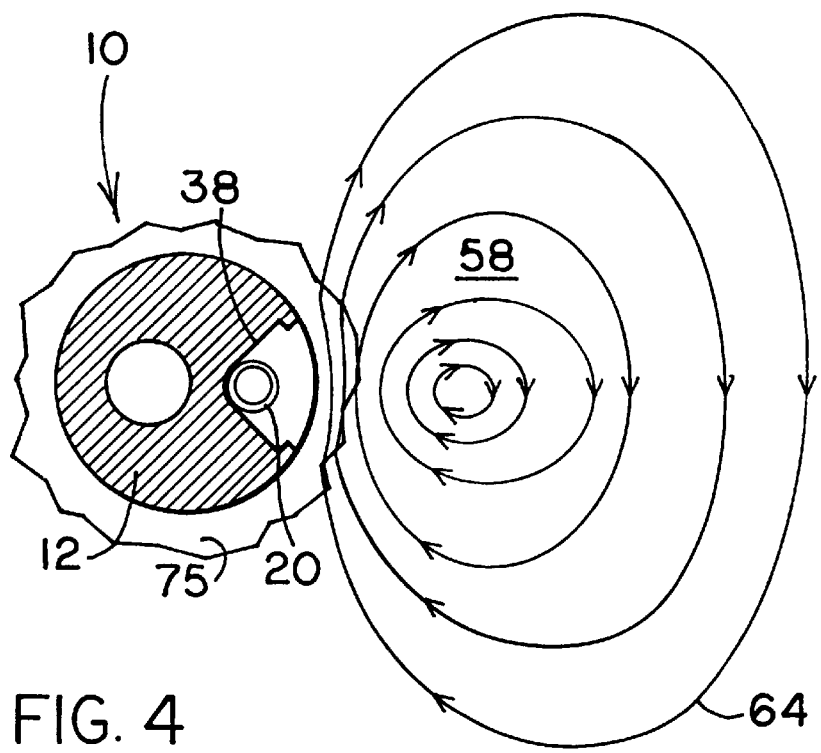
FIG. 4 is a horizontal cross-sectional view showing lines of eddy current flow.

FIG. 4 illustrates the lines of Foucault currents 64 flowing in a conductive medium 58 proximate the tool 10 in plane 4—4 passing through the main receiver coil, as indicated by section line 4—4 in FIG. 3. The current flow is confined primarily to a region generally in the direction faced by the coil array and substantially bounded by the angle subtended by the reflector. The theoretical spatial response of such a system may be calculated using finite element modeling computer software, which is available from several software companies, using techniques that are well known in the art.

Figure 5:
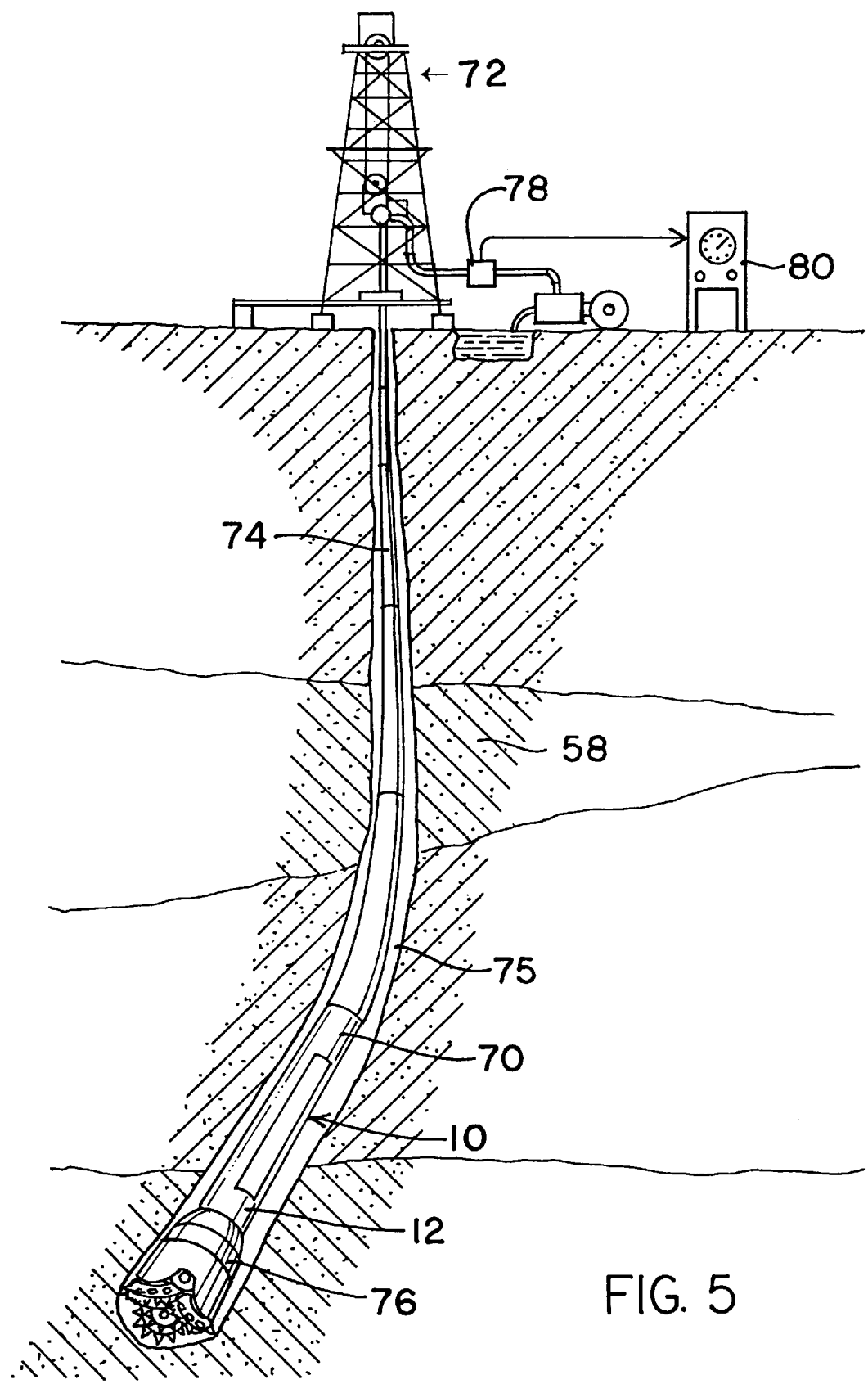
FIG. 5 is an illustration of the induction tool operatively placed in a drill-string.

FIG. 5 is a general view of induction logging tool 10 placed in drill-collar 12 during a directional-drilling operation using a preferred embodiment of the present invention. Induction tool 10 may be combined with orientation sensors and a mud-pulse telemetry system, which may be located in instrument package 70, disposed within collar 12. The mud pulse system, which is well known in the art, provides for direct transmission of data to the surface during drilling operations where it can be used to facilitate geosteering techniques. The data may be detected at the surface by mud-pulse receiver 78 for decoding, storage and display on operator panel 80. Induction tool 10 may alternatively be placed below a mud-motor very close to the drill-bit 76. A short-range telemetry system may be employed in such a system to communicate resistivity data past the motor to a mud-pulse telemetry system, so that resistivity data may be acquired as close as possible to the bit. In such a configuration, placing the induction tool 10 in a side-pocket of collar 12 leaves the bore 30 of collar 12 open for a drive-shaft between the mud motor and the bit.

Figure 6:
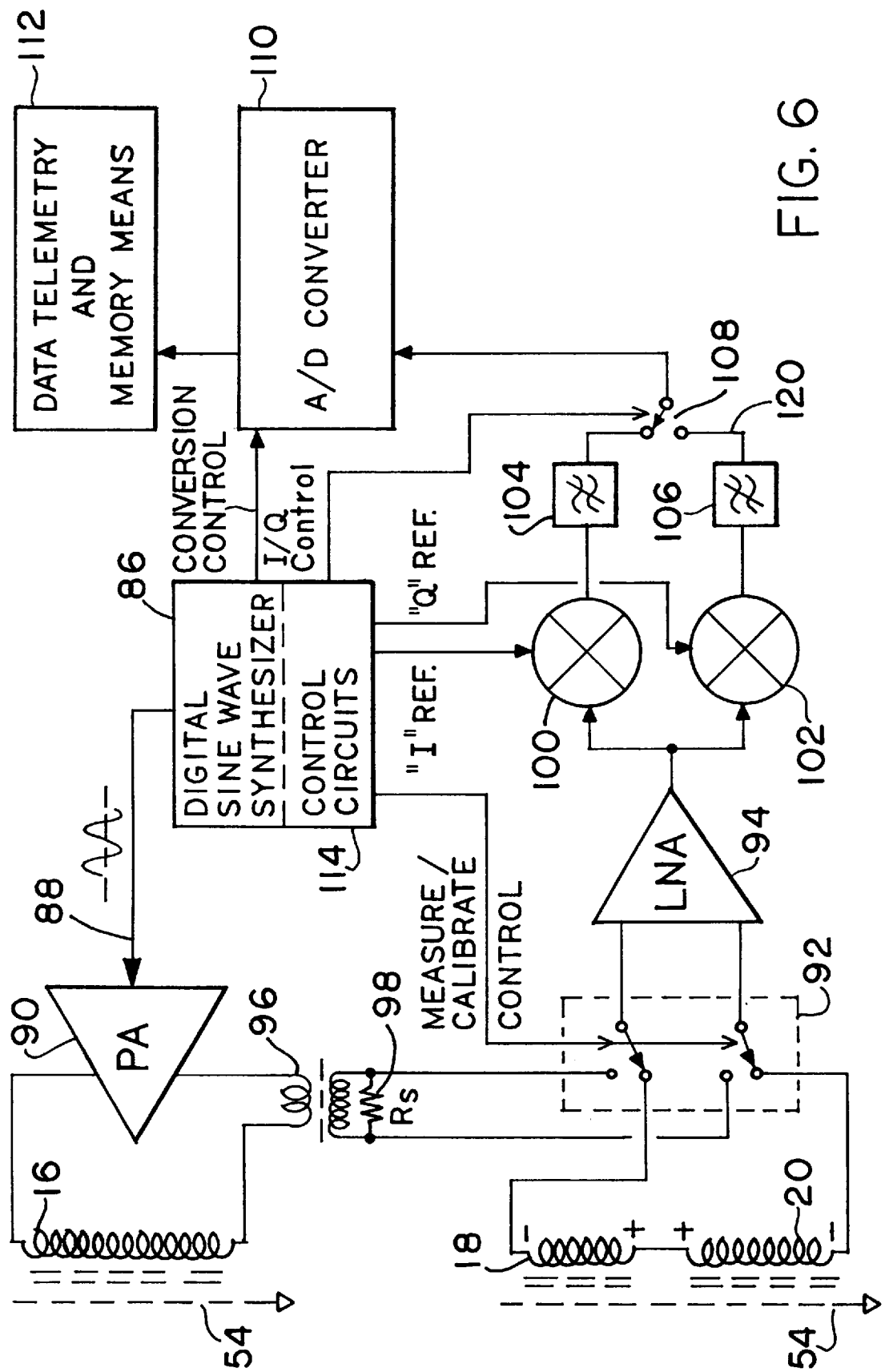
FIG. 6 is a block diagram of electronic circuits that may be used for data acquisition.

FIG. 6 is a block-diagram of a preferred embodiment showing exemplary electronic circuits that may be used to acquire data using the sensor coil arrangement described above. It is desirable, in view of the error-signal contributions expected because magnetic cores 50 and reflector 38 are not perfect materials, to measure the in-phase and quadrature components (shown here as the "I" or in-phase and "Q" or quadrature phase components) of the received signal voltages, where phase is measured relative to the phase of the transmitter energizing current. In the preferred embodiment, digital synthesizer circuit 86 generates a spectrally pure sine-wave output 88 at a frequency preferably in the range of 20 KHz to 80 KHz and supplies it to power amplifier (PA) 90, which drives a high oscillating current through transmitter coil 16. The receiver coils, main receiver 20 and bucking receiver 18, which are connected in phase opposition to cancel direct mutual coupling to the transmitter primary flux, are connected through multiplexing switch 92 to a low-noise amplifier (LNA) 94. Switch 92 can alternately connect a calibration signal derived from PA 90 output current flowing through transformer 96 and resistor 98 to LNA 94. Amplified signals output from the LNA are supplied to "I" phase-sensitive detector (IPSD) 100 and "Q" phase-sensitive detector (QPSD) 102, which have outputs that are connected to filters 104,106 selected to remove undesired harmonic components. The outputs of filters 104 and 106 are connected to switch 108, which alternately connects the in-phase and quadrature signals to A/D converter 110. Digital data output from A/D converter 110 are supplied to telemetry and/or storage circuitry 112 for storage or for transmission to the drilling rig by mud-pulse telemetry or other techniques known in the art. Digital control circuits 114 control the operation of switches 92, 108 and A/D converter 110 to acquire a desired sequence of "I" and "Q" samples of the received voltage from receiver coils 18, 20 and calibration signals from transformer 96.

All induction tools in use today comprise coil arrays with zero mutual inductance coupling between transmitter coils and receiver coils. There are two important reasons for this; first, the primary magnetic flux is usually several orders of magnitude larger than the secondary flux, and if not balanced out it would induce a voltage in the receiver coils that would overload sensitive electronic amplifiers and mask formation returns. Second, the mutual balance condition is required to minimize sensitivity of the tool to conductive drilling mud in the borehole 75. Specifically, the first derivative of the integrated radial geometrical factor is zero at the axis of the coils when mutual balance is achieved.

Any perturbation of the mutual balance has a significant effect on tool performance and accuracy. Normally, great effort is made to design coil arrays with high mechanical stability, and potentially unstable magnetic cores are avoided. Various schemes to cancel error signals due to unbalanced coils are known in the art, including injection of compensating signals into the input of the LNA circuits, but these methods do not correct for variations in the borehole mud conductivity, thereby introducing other unpredictable error signals.

Figure 7:
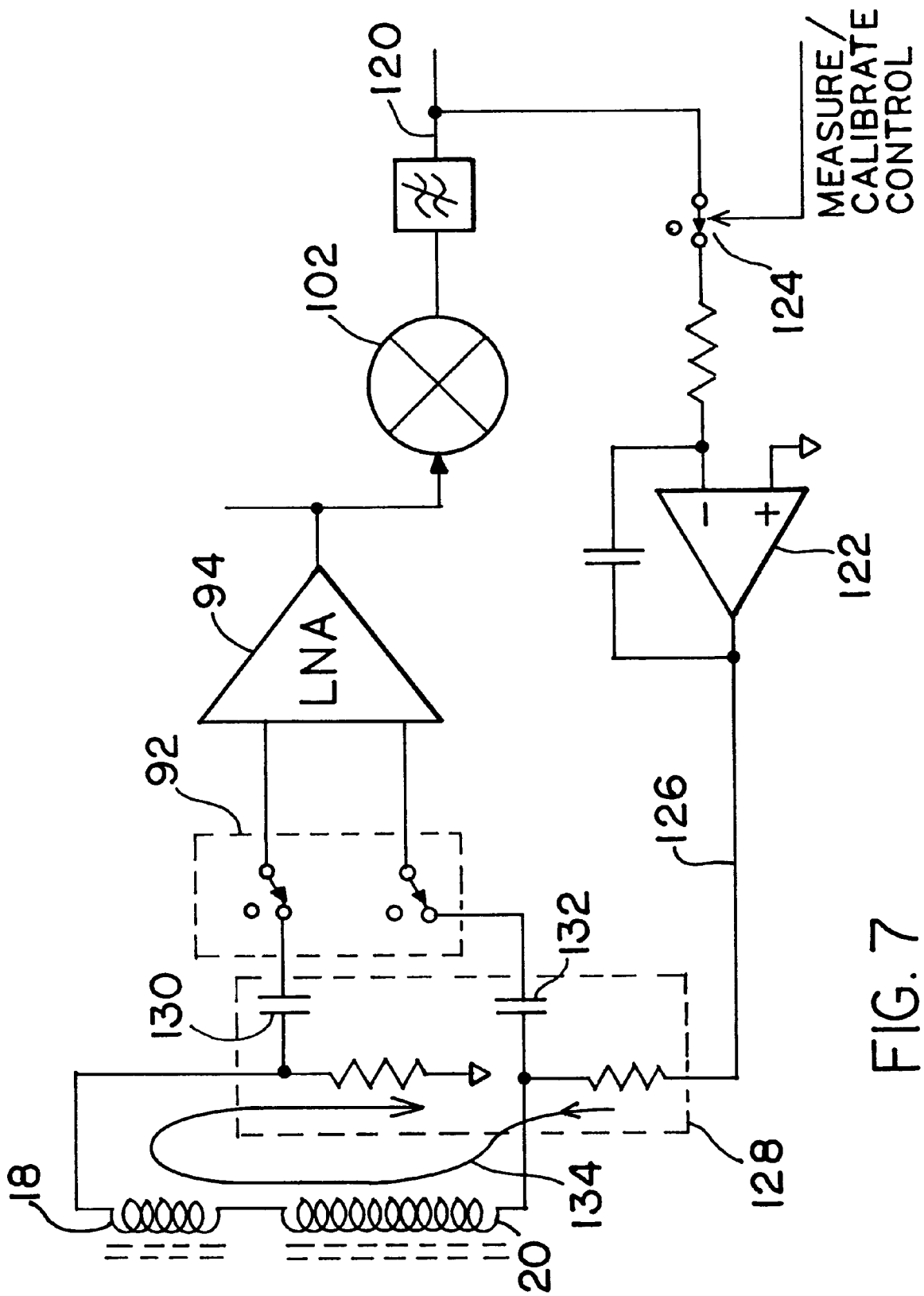
FIG. 7 illustrates additional circuits that may be employed to automatically zero mutual errors.

In preferred embodiments of the present invention, an alternative and preferred means to eliminate such balance problems is employed. Referring to FIG. 7, which is to be considered in combination with FIG. 6 to illustrate an extension of that basic block diagram, the filtered output 120 of "Q" PSD 102 is passed to the input of integrator operational amplifier 122 via switch 124 that is closed only during the time when input of the LNA 94 is connected to the receiver coils 18, 20 by switch 92. A voltage at output 126 of integrator 122 is supplied to a resistor/capacitor network 128 configured to force a D.C. bias current through receiver coils 18, 20 (proportional to the integrator output) while passing the A.C. signals through capacitors 130, 132 to switch 92 and LNA 94 as before. This apparatus makes use of the phenomenon that the initial permeability of a ferromagnetic material, such as core 50 placed inside coil 20, is sensitive to the intensity of the steady magnetic flux passing through it. Thus a D.C. bias current passed through a receiver coil will create a biasing magnetic flux that modulates the permeability of the magnetic core therein and changes the mutual balance of the coil sensor array.

Using this arrangement, any voltage appearing at the output of "Q" PSD 102 is amplified and applied as a bias current 134 to receiver coils 18, 20 in a negative feedback method to immediately suppress "Q" PSD output, which is the component of the received voltage that is primarily responsive to unbalanced mutual coupling. In designing a tool 10 according to this invention, coils 18, 20 are preferably mechanically positioned very close to the nominal mutual balance locations within the sensor package, but intentionally slightly offset therefrom to allow the bias current circuit to act to maintain the balance with an adequate dynamic range available to correct for temperature drift. By extension, if the coil array becomes out of mutual balance for any reason, this circuit will automatically correct it.

Integrator amplifier 122 is used because variations in mutual balance are expected to be quite slow in time, while it is important that the bias circuit should not inject any noise signals into the sensitive LNA input. In alternative embodiments, the bias current may be passed through only one of the receiver coils to provide a stronger modulation of mutual balance, but it is preferable to connect the circuit to both coils as shown because individual coil connections are not ordinarily readily accessible to data acquisition circuit 22. In general, an increase of bias current 134 causes a decrease in permeability, but in no case should the bias be more than a small fraction of the saturation flux density of the cores. The method therefore does not modify the inherent gain factor of the tool to any significant degree, which is controlled primarily by the length/diameter ratio of the cores, as previously described.

In an alternative embodiment, the bias current may be selected by periodically transmitting a signal having a different frequency than that used for conductivity measurements and measuring the "I" and "Q" return signals at that different frequency. One skilled in the art could design circuitry to implement such an embodiment.

Factors that affect the mutual balance of the receiver coils 18, 20 include relative motion of the coils and magnetic cores due to temperature expansion or pressure stress effects in the support structure, and temperature or pressure effects on the magnetic core permeability. As shown in FIG. 1, in preferred embodiments, a piston pressure compensator 14 transmits borehole pressure to internal insulating oil 17 in fiberglass tube 55 with slight excess pressure of 20 to 50 psi to prevent contamination of the sensor package by borehole fluids. The insulating oil fills any gaps between instrument components and serves to equalize the pressure throughout the instrument. In use, the coil/core assemblies may be exposed to hydrostatic pressures of as high as 20,000 psi. In these conditions, many magnetic materials exhibit a modest decrease in permeability; for example, permalloy (the active ingredient in MPP) shows a decrease of approximately 5%. The same material may exhibit an increase in permeability of 3% when the temperature is raised to 400 degrees Fahrenheit, which is not an uncommon downhole temperature. Although these two effects may sometimes tend to cancel out in a deep well, this cannot be assumed and the system design should be capable of correcting both variations.

There are, in addition, other sources of a "Q" component of the received signal that are not related to the tool itself In cases of very high formation conductivities (above two mhos/meter in the described configuration) the phenomenon of skin-effect plays a steadily increasing role in phase-shifting and attenuating the signal voltage induced in the receiver coils 18, 20, resulting in a rapid increase in the "Q" component of the signal relative to the "I" component that is usually representative of formation conductivity. In this case, the "I" component is no longer proportional to formation conductivity, and various methods of a mathematically boosting the "I" component or combining the "I" and "Q" components are wellknown in the art. In preferred embodiments, a modification may be made to the circuit shown in FIG. 7 that allows cancellation of relatively small values of "Q" signal (such as may be due to mutual coupling unbalance previously described) while allowing large "Q" signals (from conductive rock) to be measured. The modification comprises selecting the gain of integrator amplifier 122 so that large "Q" signals drive the bias current circuit to limit at a known value, at which time the bias current remains fixed. The varying digitized "Q" signal may then be employed (with a suitable offset correction) in known skin-effect correction algorithms for interpreting rock conductivity.

Another source of "Q" signal occurs when the tool is placed near any ferromagnetic material with a permeability even fractionally higher than free space. Examples include steel particles shed into the drilling mud by abrasion of the drill-string against the borehole wall, and naturally occurring minerals such as pyrite and siderite. These events are generally of little interest to the log analyst, and they typically produce only a small "Q" signal, so they are effectively suppressed by the method of the present invention.

Shock-mounting materials such as rubber sleeves may be placed around the coils and cores to dampen microphonic noise signals that might be induced in the coils by vibrations in the kilohertz frequency range. It will be appreciated that in a MWD tool such vibrations often attain extraordinary amplitudes and could generate noise voltages that could overload LNA 94. Residual noise signals that pass through band-limited LNA 94 are substantially rejected by PSD circuits 100, 102, which may be synchronous detectors with very narrow bandwidth. The effective noise bandwidth may be further reduced by data processing techniques on the digitized samples of the "I" and "Q" signals, such as averaging or filtering as is known in the art.

Referring to FIG. 6, preferred embodiments include circuits for acquiring digitized samples of receiver coil voltages representing formation conductivity and samples of calibration voltages. These samples may be further processed to extract corrected values of apparent formation conductivity without errors due to temperature drift of amplifier gain or phase-shift, or A/D gain. Since the calibration signal is generated by passing the transmitter coil current through current transformer 96 with a turns ratio of 1:n (where typically n=100) and a precision temperature-stable resistor Rs 98, this circuit provides a very accurate and phase-aligned representation of the transmitter current. In the ratiometric correction method to be described, the method given by Sinclair in U.S. Pat. No. 4,439,831 (which is incorporated herein by reference) is adapted to include phase correction.

Let K be the gain of the sensor package, defined as the voltage produced in the receiver coils 18, 20 for a given transmitter coil 16 current A (in amperes) and a relatively low homogeneous rock conductivity C (in mhos/meter). Also let Smi and Smq be the "I" and "Q" digitized samples of the measured receiver voltage respectively. Similarly, Sci and Scq are the digitized calibration signals. Then in general the apparent rock conductivity, Ca, is:

$$Ca = \frac{Sm}{KA}$$

where italic characters indicate complex numbers, and $$Sc = \frac{A(Rs)}{n}$$

substituting equation (3) into (2) and using j (the square root of −1):

$$Ca = Cai + jCaq = \frac{Rs(Smi + jSmq)}{nK(Sci + jScq)}$$

by the method of complex conjugates, this equation is solved:

$$Cai = \frac{Rs(SmqScq + SmiSci)}{nK(Sci^2 + Scq^2)}$$

$$Caq = \frac{Rs(SmqSci - SmiScq)}{nK(Sci^2 + Scq^2)}$$

These two equations may be solved in real-time by an appropriate digital computing device, which may be located either downhole in tool 10 or at the surface associated with the data display and storage apparatus associated with operator panel 80. Cai and Caq may be used in various algorithms to interpret true formation conductivity, which are well known in the art and beyond the scope of this disclosure. The Caq component may often be discarded since it is most corrupted by residual effects of changes in mutual balance of the coil array. A most important benefit of this ratiometric method is to greatly increase the accuracy and stability of the tool.

Figure 8:
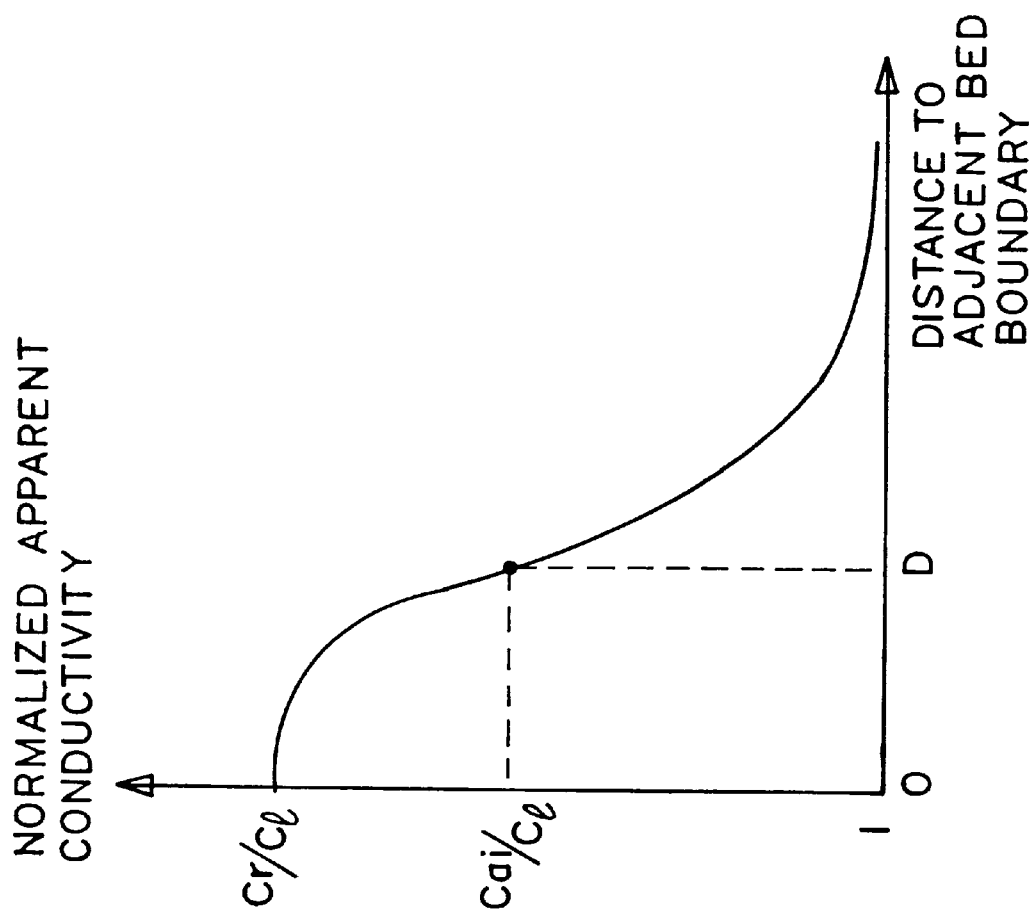
FIG. 8 shows a graph of measured conductivity as a function of distance to a contrasting bed boundary.

Referring to described embodiments of the present invention, the tool 10 may be rotated in the borehole by rotating the drill string 74. Any nearby rock bed that is more conductive than the rock immediately surrounding the borehole will be sensed as an increase in apparent conductivity Cai when the tool is angularly oriented facing toward the more conductive bed. Thus the direction of the bed boundary relative to the tool may be determined by correlation of the measured conductivity output with orientation sensors included in a drill collar (which are well known in the art) and mechanically aligned with the induction sensor package. Similarly, a less conductive bed near the borehole appears as a decrease in Cai when the tool is facing that bed. The science of computer modeling of the spatial response of induction tools provides techniques whereby complicated three-dimensional analysis can be performed to determine rock formation geometry from the data provided by a tool constructed in accordance with this invention. For all except the most conductive rock formations, where skin-effect introduces undesired variations, the spatial response is fixed and is known as the geometrical factor. FIG. 8 shows an example of the integrated radial component of the geometrical factor in the most sensitive azimuthal direction. This graph shows normalized apparent conductivity plotted as a function of distance to the boundary between the bed adjacent the borehole and another bed having contrasting conductivity, for a given formation geometry and conductivities. For simplicity, the apparent conductivity Cai and the adjacent bed conductivity Cr are normalized by dividing by the local rock conductivity $C_l$ around the borehole. In this example, the distance to the adjacent bed may be solved by plotting $Cai/C_l$ across to the curve and finding the intercept at distance D. This method requires knowledge of Cr and $C_l$, which may be obtained from offset well logs, or preferably from measurements in the same rock beds at other points or in other directions while drilling through them.

The present invention thus provides an improved directional induction logging tool suitable for installation in a drill collar for measurement-while-drilling. This tool provides real-time formation data with a relatively deep depth of investigation, which will be particularly useful for locating formation boundaries during geosteering operations.

Further modifications and alternative embodiments of this invention will be apparent to those skilled in the art in view of this description. Accordingly, this description is to be construed as illustrative only and is for the purpose of teaching those skilled in the art the manner of carrying out the invention. It is to be understood that the forms of the invention herein shown and described are to be taken as the presently preferred embodiments. Various changes may be made in the shape, size and arrangement of parts. For example, equivalent elements may be substituted for those illustrated and described herein, and certain features of the invention may be utilized independently of the use of other features, all as would be apparent to one skilled in the art after having the benefit of this description of the invention.

I claim:

1. A directional instrument for measuring while drilling electrical properties of rock formations adjacent to a borehole, comprising:
    a) a transmitter coil coupled to a signal generator for providing to the transmitter coil an oscillating voltage at a frequency of between 1 KHz and 200 KHz;
    b) at least one receiver coil disposed coaxially to the transmitter coil, the axis of the coils defining the axis of the instrument, the at least one receiver coil being coupled to a signal processing circuit for determining an electrical property of the rock formation from signals received; and
    c) a conductive reflector spaced from the transmitter coil, the reflector being generally parallel to the axis of the instrument, the transmitter coil, the at least one receiver coil, and the conductive reflector included in a side pocket of a conductive collar in a drill string including a drill bit so the directional measuring instrument can perform measurement while drilling.

2. The instrument of claim 1, wherein the reflector is generally "V" shaped in cross-section, with the transmitter coil arranged within the "V" and generally parallel to the reflector.

3. The instrument of claim 1, wherein the at least one receiver coil comprises a main receiver coil and a bucking receiver coil that are connected in series in opposition to each other.

4. The instrument of claim 1, further comprising magnetically permeable core material disposed within each of the transmitter and receiver coils.

5. The instrument of claim 4, further comprising a balancing circuit for detecting any imbalance in a mutual inductance coupling between the transmitter and receiver coils and for adjusting the magnetic permeability of the core material in at least one of the coils to correct the imbalance.

6. The instrument of claim 5, wherein the balancing circuit comprises a direct current generating circuit that is connected to said at least one of the coils so as to pass a selected current therethrough, and wherein the direct current generating circuit is connected to receive a quadrature phase signal from the signal processing circuit.

7. The instrument of claim 4, further comprising means for dynamically altering the permeability of the core material in at least one of the coils in order to correct any imbalance in mutual inductance coupling between the transmitter and receiver coils.

8. The instrument of claim 1, wherein the signal processing circuit includes an analog-to-digital converter that provides a digital output signal corresponding to apparent conductivity measured by the instrument.

9. The instrument of claim 1 in which the conductive reflector is spaced from at least one of the receiving coils as well as the transmitting coil.

10. The instrument of claim 1 in which the conductive reflector produces one or more virtual images of the transmitter coil.

11. The instrument of claim 1 in which the transmitter coil transmits a time-varying magnetic field that induces electrical currents in the rock formation.

12. The instrument of claim 11 in which the depth in the rock formation at which the electrical currents are induced is not limited by the skin effect.

13. The instrument of claim 11 in which the electrical currents induced in the rock formation create a time varying magnetic field that induces voltage in the receiving coil, the voltage induced in the receiving coils being related of the conductivity of the rock formation.

14. The instrument of claim 13 in which the voltage induced in the receiving coils is related to the conductivity of the rock formation at a distance of up to 5 feet from the borehole.

15. The instrument of claim 1 in which the conductive reflector has a thickness of approximately six times the skin depth at the frequency transmitted by the transmitter coil.

16. The instrument of claim 1 in which the transmitter and the at least one receiver coils are protected by a mixture comprising abrasion-resistant particles and epoxy.

17. The instrument of claim 1 in which the at least one receiving coil includes multiple pairs of receiving coils, each pair including a main receiving coil and a bucking receiving coil.

18. The instrument of claim 1 in which the conductive reflector extends from the transmitter coil to behind the at least one receiver coil.

19. A directional resistivity tool for measurement while drilling adapted to provide a measurement of formation resistivity on a selected side of a borehole, comprising:
    a) a conductive drill collar having formed therein a side pocket and a flow channel;
    b) an electromagnetic reflector formed in the side pocket;
    c) a transmitter coil disposed within the side pocket and operably coupled to a signal generator providing an oscillating voltage at a frequency of between 1 KHz and 200 KHz., the transmitter coil positioned with respect to the electromagnetic reflector such that a portion of the output of the transmitter is redirected by the electromagnetic reflector toward the formation and away from the conductive drill collar; and
    d) at least one receiver coil disposed within the side pocket and spaced from the transmitter coil, the receiver coil being coupled to a signal processing circuit.

20. The instrument of claim 19, wherein the electromagnetic reflector is generally "V" shaped in cross-section, with the transmitter coil and the at least one receiver coil arranged coaxially within the "V" and generally parallel to the reflector.

21. The instrument of claim 19, wherein the drill collar is fabricated from a highly conductive material, such that a surface of the drill collar forming the side pocket forms the electromagnetic reflector.

22. The instrument of claim 21 in which the highly conductive material comprises beryllium-copper.

23. The instrument of claim 19, wherein the at least one receiver coil comprises a main receiver coil and a bucking receiver coil that are connected in series in opposition to each other.

24. The instrument of claim 19, further comprising magnetically permeable core material disposed within each of the transmitter and the at least one receiver coils.

25. The instrument of claim 19, wherein the signal processing circuit includes an analog-to-digital converter that provides an output signal corresponding to conductivity measured by the instrument.

26. The instrument of claim 19 in which the at least one receiver coil comprises a plurality of receiver coils, thereby providing multiple spatial responses.

27. A method of measuring while drilling electrical properties of subsurface formations adjacent a borehole in a selected azimuthal direction from the borehole while the borehole is being drilled with a bit, comprising:

a) providing a directional electrical property measuring tool disposed in a side pocket of a conductive drill collar near the bit, the directional electrical property measuring tool including a transmitter coil, one or more receiver coils, and a conductive reflector;

b) energizing the transmitter coil with a selected periodic signal having a frequency of between 1 KHz and 200 KHz;

c) reflecting a portion of the output of the transmitter coil toward the subsurface formation;

d) detecting return signals using the one or more receiver coils; and e) processing the return signals to determine an electrical property of the subsurface formation.

28. The method of claim 27, wherein the directional resistivity measuring tool comprises in-phase and quadrature phase detectors coupled to the receiver coil, and wherein the processing step comprises obtaining an in-phase component of the return signal and a quadrature phase component of the return signal.

29. The method of claim 27, further comprising rotating the drill collar to a second selected azimuthal direction from the borehole and measuring the apparent conductivity in said second direction.

30. The method of claim 29, further comprising rotating the drill collar to additional selected directions to obtain a plurality of apparent conductivity measurements in various azimuthal directions around the borehole.

31. The method of claim 30, further comprising determining the direction of a nearby conductivity discontinuity relative to the borehole using the plurality of apparent conductivity measurements.

32. The method of claim 27, further comprising determining the distance of a conductivity discontinuity from the borehole, where the conductivity discontinuity is a boundary between the rock formation immediately surrounding the borehole and a nearby rock formation having a different conductivity.

33. The method of claim 32, further comprising obtaining a first conductivity of the rock formation immediately surrounding the borehole and a second conductivity of a nearby rock formation having a different conductivity, and using the first conductivity and the second conductivity, in conjunction with a measured apparent conductivity, to determine the distance from the borehole to the conductivity discontinuity.

34. The method of claim 27, further comprising correcting an imbalance in a mutual inductance coupling between the transmitter coil and the receiver coil by altering the magnetic permeability of core material located within at least one of the coils by directing a selected direct current signal to said at least one of the coils.

35. The method of claim 34, further comprising integrating quadrature phase signals detected by the receiver coil to control the magnitude of the direct current signal.

36. The method of claim 35, further comprising limiting the magnitude of the direct current signal to avoid masking high quadrature-phase components of formation return signals.

37. The method of claim 27 wherein the one or more receiver coils includes a main receiver coil and a bucking receiver coil.

* * * * *